C. F. HENNING.
MACHINE FOR AUTOMATICALLY MANIPULATING THE CORE POLES OF MOLDING MACHINES.
APPLICATION FILED NOV. 14, 1914.

1,208,557.

Patented Dec. 12, 1916.
7 SHEETS—SHEET 5.

C. F. HENNING.
MACHINE FOR AUTOMATICALLY MANIPULATING THE CORE POLES OF MOLDING MACHINES.
APPLICATION FILED NOV. 14, 1914.

1,208,557.

Patented Dec. 12, 1916.
7 SHEETS—SHEET 6.

C. F. HENNING.
MACHINE FOR AUTOMATICALLY MANIPULATING THE CORE POLES OF MOLDING MACHINES.
APPLICATION FILED NOV. 14, 1914.

1,208,557.

Patented Dec. 12, 1916.
7 SHEETS—SHEET 7.

Witnesses:
Harry S. Gaither
Ernest H. Merchant

Inventor
Charles F. Henning
by
Atty

UNITED STATES PATENT OFFICE.

CHARLES F. HENNING, OF CHICAGO, ILLINOIS, ASSIGNOR TO THE UNITED STATES GYPSUM COMPANY, OF CHICAGO, ILLINOIS, A CORPORATION OF NEW JERSEY.

MACHINE FOR AUTOMATICALLY MANIPULATING THE CORE-POLES OF MOLDING-MACHINES.

1,208,557.

Specification of Letters Patent.    Patented Dec. 12, 1916.

Application filed November 14, 1914.   Serial No. 872,139.

*To all whom it may concern:*

Be it known that I, CHARLES F. HENNING, a citizen of the United States, residing at Chicago, in the county of Cook and State of Illinois, have invented certain new and useful Improvements in Machines for Automatically Manipulating the Core-Poles of Molding-Machines, of which the following is a specification.

My invention relates to an automatic machine for inserting and removing core poles from the molds of continuously operable molding machines and particularly the plaster block molding machines described in the application of Charles R. Birdsey and Charles F. Henning, Patent No. 1,116,669, November 10, 1914. In molding machines of this character a plurality of core poles are inserted in each mold and supported on suitable openings in the sides thereof in order that the block may be partially hollow and therefore lighter in weight than a solid block. Heretofore it has been customary to employ men to insert the core poles previous to filling the molds with plastic material and to remove them before the blocks are delivered from the machine. In molding machines of considerable size and large output a number of men are required constantly to perform the necessary operations, thus entailing a considerable additional expense.

It is an object of my invention to provide a machine which will automatically insert and remove the core poles from the molds at proper intervals without manual assistance of any kind.

Other objects and advantages of my invention will be apparent as it is better understood by reference to the accompanying specification in connection with the accompanying drawings in which—

Figure 1:
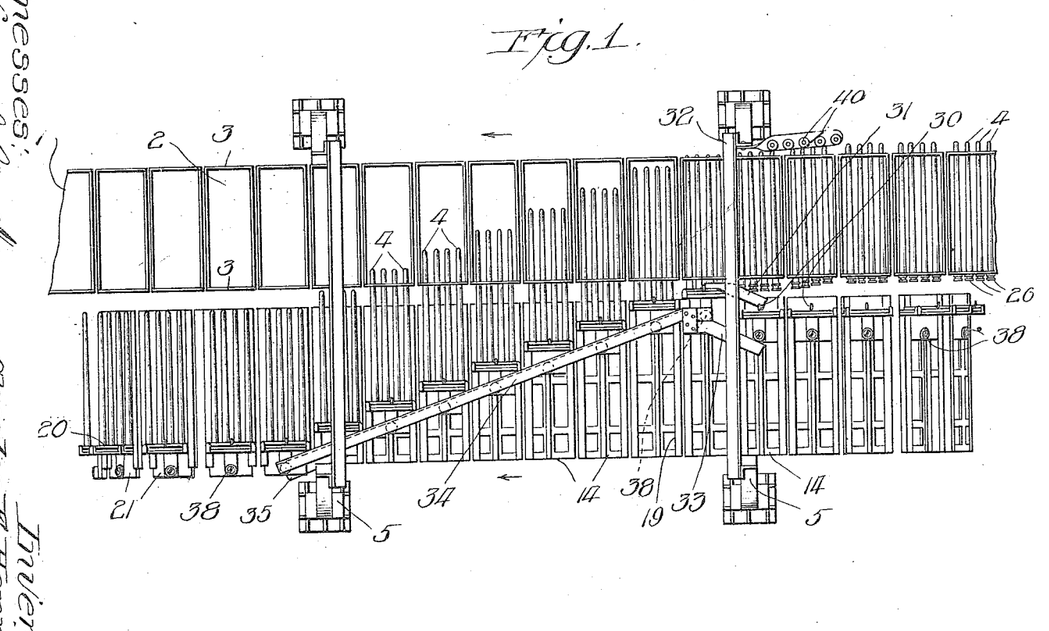
Figure 1 is a plan view of my invention with a portion of a block molding machine showing the operation of removing the core poles from the molds.
Figure 5:
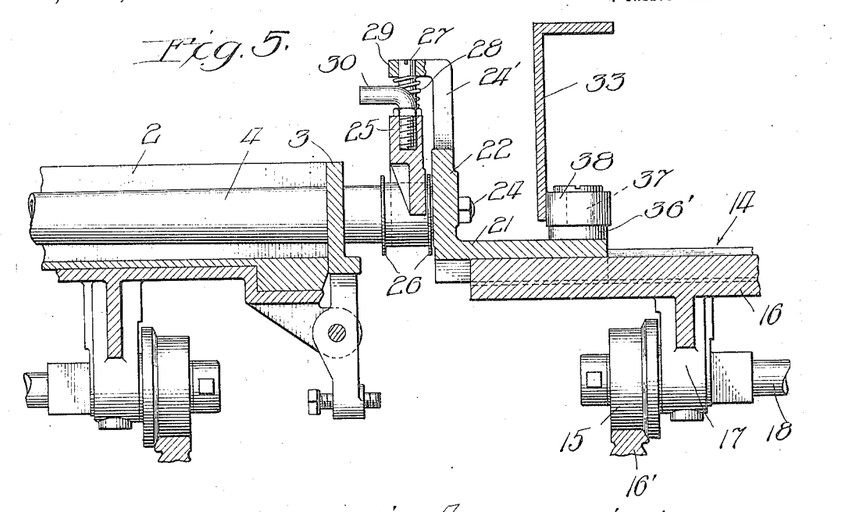
Fig. 5 is a vertical section on the line 5—5 of Fig. 4.

Referring to the drawings, 1 indicates generally a molding machine of the type described in the application to Birdsey and Henning, previously referred to, which comprises a plurality of molds 2 forming an endless band adapted to be continuously moved in the direction indicated by the arrow in Fig. 1. Each of the molds is provided with ends 3 (see Fig. 5) having a plurality of openings to accommodate the core poles 4, which are inserted in the molds previous to filling the same and removed therefrom after the material has hardened. The object of the core poles 4, as has previously been explained, is to provide openings through the blocks, formed in the molds, in order that they may be lighter in weight than solid blocks. For this purpose I prefer to employ a tapered hollow metal pole.

Figure 2:
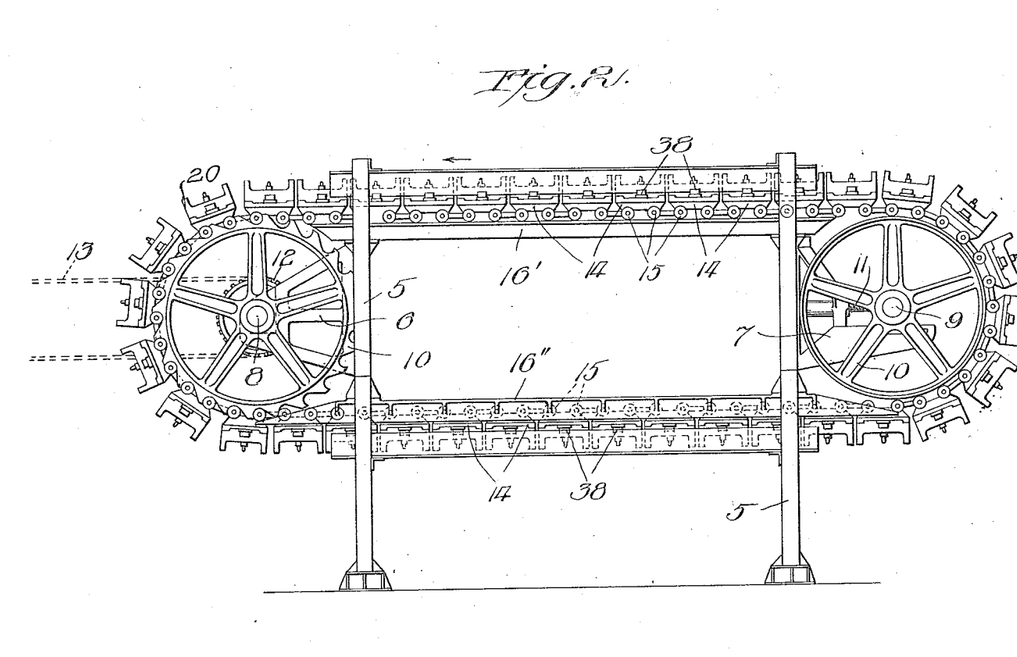
Fig. 2 is a side elevation of my present invention.

My present invention comprises an endless conveyer adapted to be disposed adjacent the molding machine, as indicated in Fig. 1, having thereon means for automatically inserting the core poles 4 into the empty molds 2 and for removing such core poles from the molds after the block has hardened and before it is delivered from the molding machine. A frame 5 (see Fig. 2) of suitable form is provided to support the mechanism adjacent the molding machine 1. Mounted in brackets 6 and 7 on the frame 5 are shafts 8 and 9, respectively, which support the sprockets 10. The brackets 7 are provided with adjusting means 11, whereby the shaft 9 may be moved to and from the frame 5 to provide proper tension in the endless conveyer. The shaft 8 is adapted to be driven through a sprocket 12, mounted thereon, and a chain 13, from any suitable source of power, preferably the driving means for the molding machine. The endless conveyer consists of a plurality of articulated members 14, each comprising a bottom plate 16 having depending portions 17 forming journals for the axles 18 to which the wheels 15 are secured. The wheels 15 run on tracks 16' and 16'' secured to the frame 5. The bottom plates 16 are further provided with grooves or runways 19 in which the core pole carriers 20 are adapted to be reciprocated as will presently be explained. The core pole carriers 20 are held in the grooves 19 by plates 19' bolted to the bottom plates 16. At either end the endless conveyer is disposed about the sprockets 10, whereby the conveyer is driven in the direction indicated by the arrows in Figs. 1 and 2.

Figure 3:
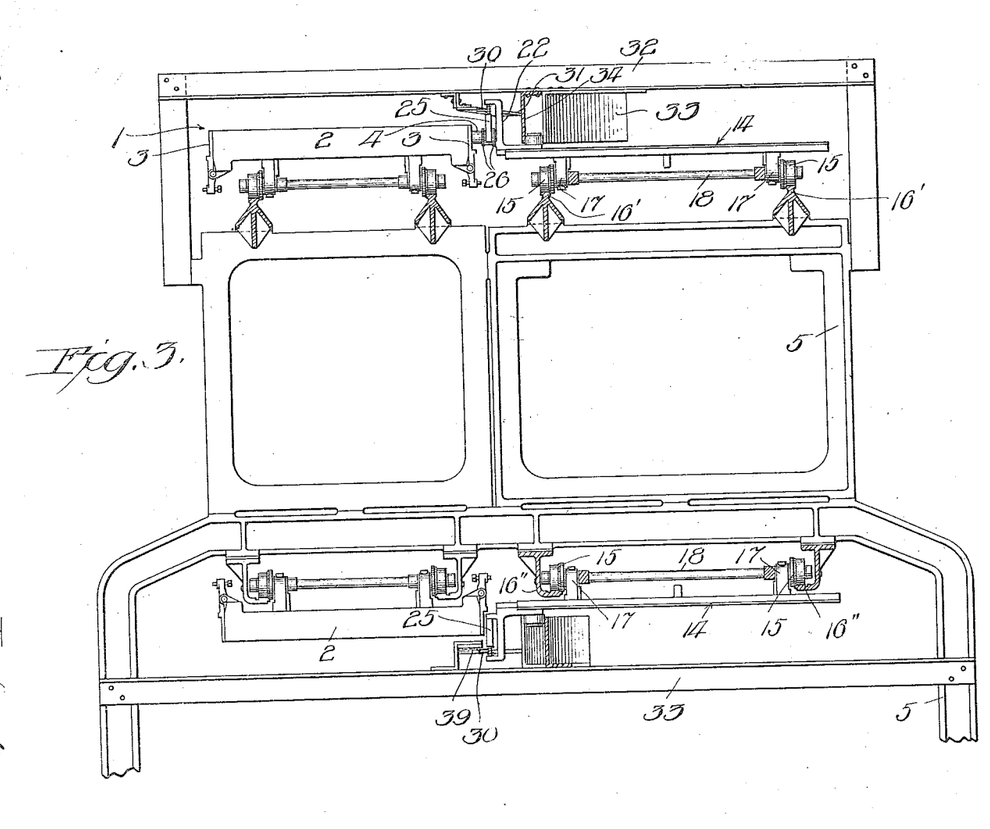
Fig. 3 is a transverse section through my present invention and the molding machine, a portion of the mechanism being omitted.
Figure 4:
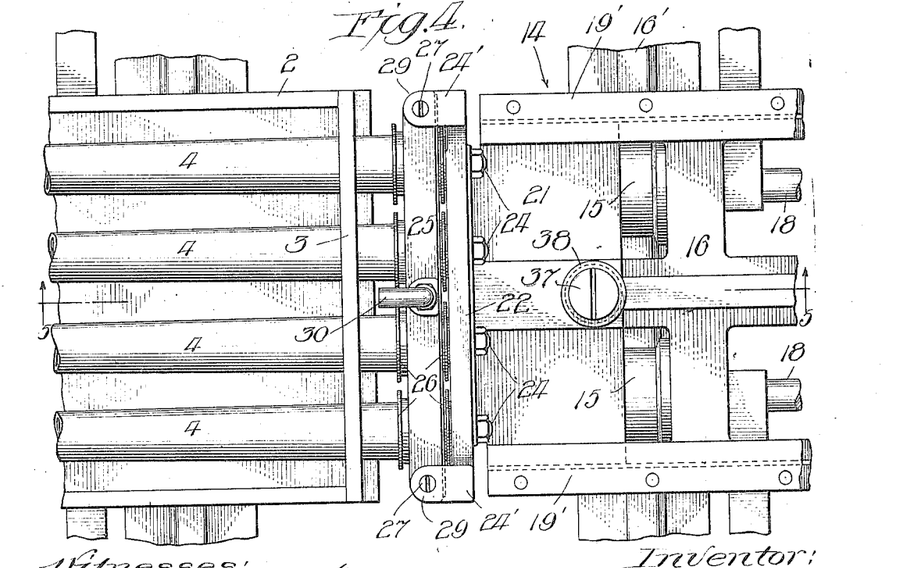
Fig. 4 is a plan view of a portion of a single core pole carriage and a portion of the corresponding mold with the core poles in place.
Figure 6:
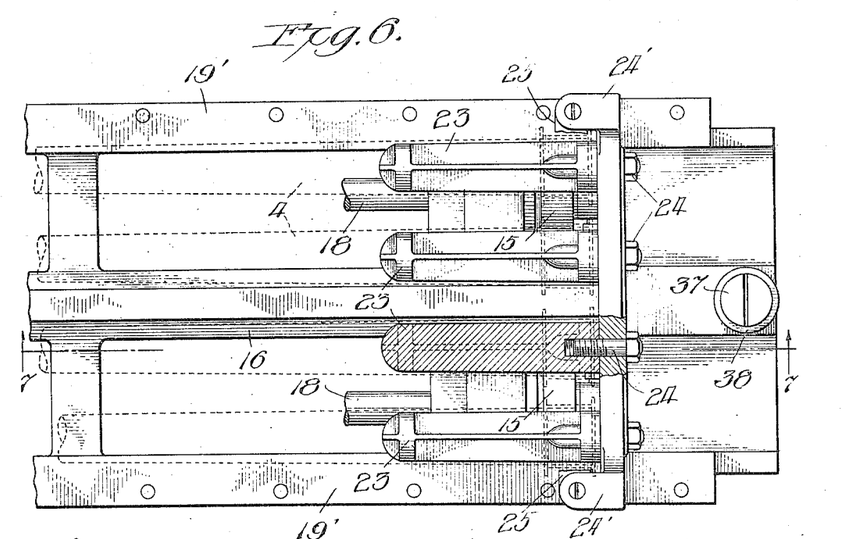
Fig. 6 is a plan view of core pole carriage with the clamping means in its rearmost position to withdraw the core poles from the molds.
Figure 7:
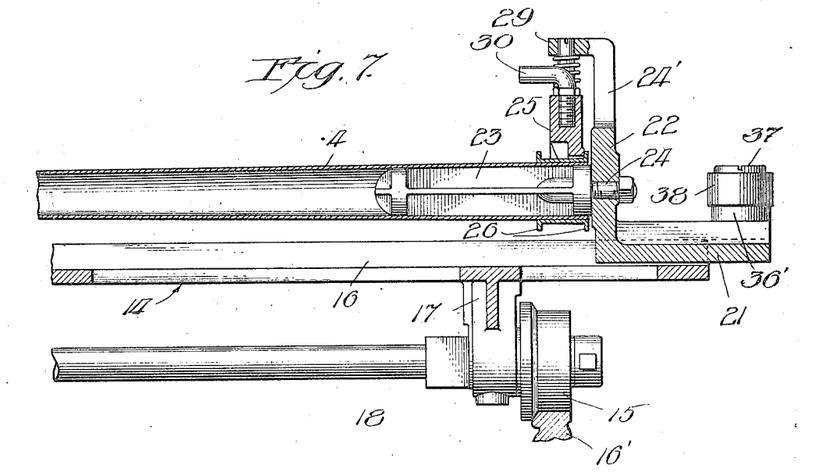
Fig. 7 is a vertical section on the line 7—7 of Fig. 6.
Figure 8:
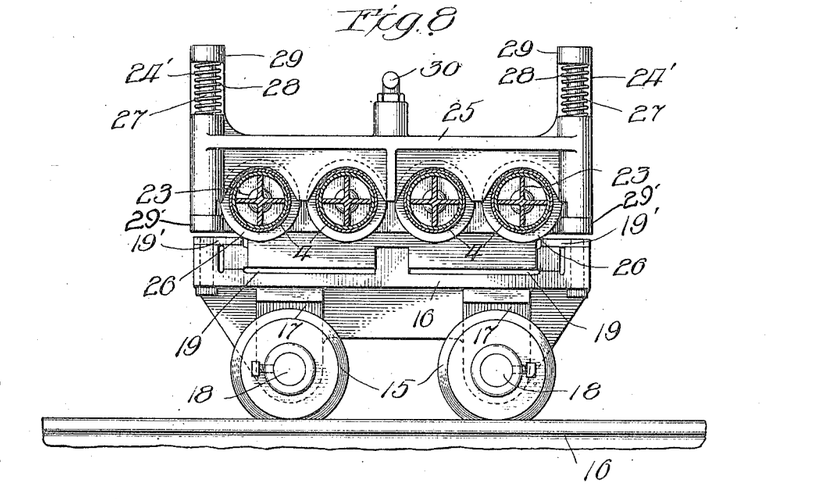
Fig. 8 is an elevation of the clamping means on the core pole carriage showing the clamping portion.
Figure 9:
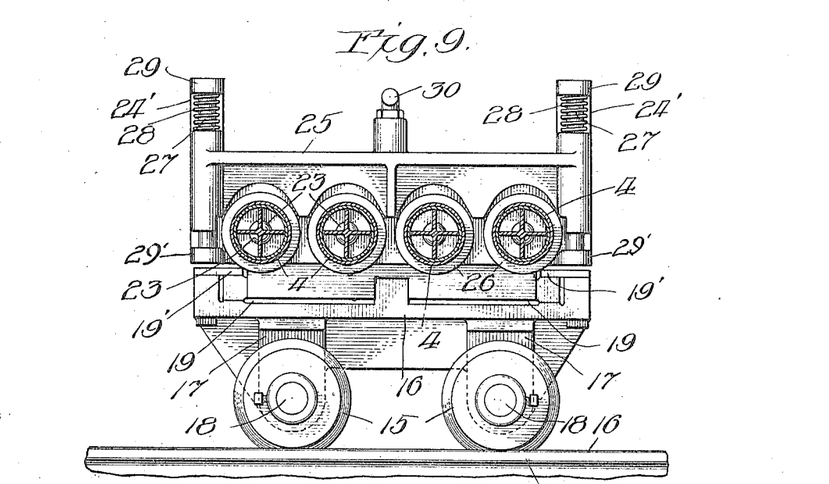
Fig. 9 is an elevation of the clamping means on the core pole carriage showing the releasing portion.

The core pole carriers 20 comprise a base portion 21 adapted to be slidably mounted in the grooves 19 and an upstanding portion 22 to which a plurality of pins 23 are secured by bolts or other suitable means 24. The pins 23 are preferably of skeleton form, as indicated in Figs. 6 and 7, to reduce the weight thereof and are adapted to enter the core poles 4 during the operation of the machine and support them as they are withdrawn and until they are re-inserted in the molds 2. The upstanding portion 22 of each core pole carrier 20 is provided with extensions 24' at either end thereof to support the clamp 25 which is adapted to engage the core poles 4 between the flanges 26 thereon and hold them rigidly on the pins 23, while the core poles are withdrawn from and until they are again inserted into the molds 2. The clamp 25 is slidably mounted at either end on pins 27 between abutments 29 and 29' and is normally forced into clamping position by springs 28 disposed about the pins 27 between the abutments 29 and the clamp 25. The clamp 25 is provided near its center with a bent pin 30 suitably secured thereto, which pin is adapted to ride upon a cam plate 31 (see Fig. 3), secured to a transverse member 32 of the frame 5, as the individual conveyer member 14 approaches the core pole removing position, to lift the clamp 25 to the position indicated in Fig. 9 so that it can pass over the flanges 26 of the core poles 4. When the core pole carrying member 20 has been forced to its foremost position, through mechanism which will presently be described, the pin 30 drops from the cam plate 31 and the springs 28 force the clamp 25 to the position shown in Fig. 8, whereby the core poles 4 are rigidly supported and held on the pins 23. The core poles 4 are then withdrawn from the molds by the rearward movement of the core pole carrier 20.

Figure 10:
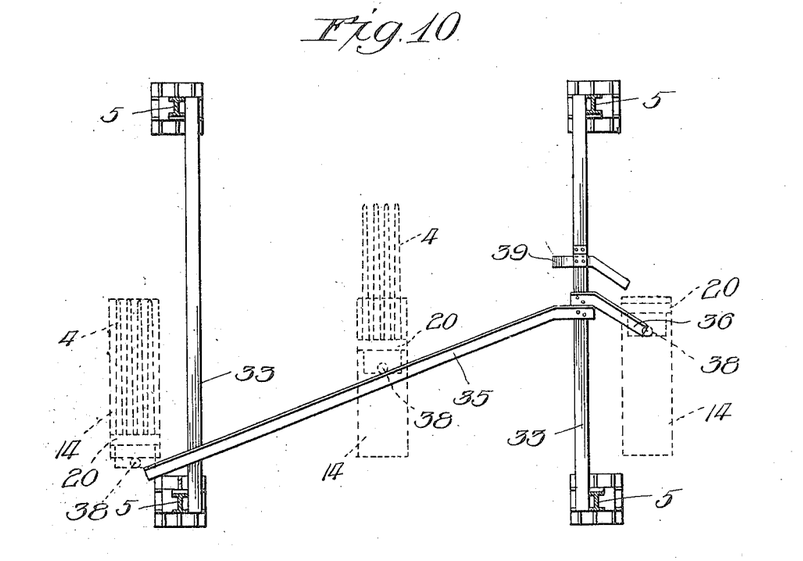
Fig. 10 is a plan view of the lower cam track for controlling the movement of the core pole carriage.
Figure 11:
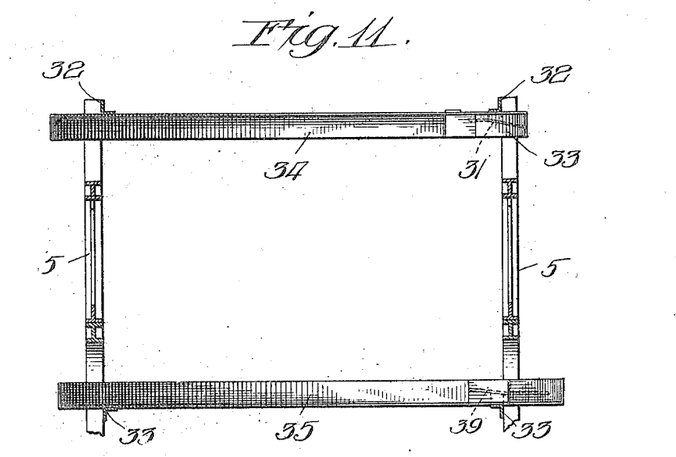
Fig. 11 is a transverse section through the machine with a portion of the mechanism omitted to show the upper and lower cam tracks.

The movements of the core pole carrier 20 from and toward the molding machine to withdraw and insert the core poles 4 in the molds 2 are controlled by means of cam tracks 33, 34 (see Fig. 1), 35 and 36 (see Fig. 10), mounted on the transverse members 32 and 33 of the frame 5 above and below the conveyer, respectively. Each of the core pole carriers 20 is provided with an upstanding member 36' carrying a pivot 37 upon which is disposed a roller 38 adapted to coact with the cam tracks 33, 34, 35 and 36. As the conveyer moves in the direction indicated by the arrow in Fig. 1 the core pole carriers 20 approach the cam track 33 until an individual roller 38 contacts therewith whereupon the core pole carrier 20 corresponding to the roller 38 is forced forwardly, while at the same time the clamp 25 is gradually raised through the medium of cam plate 31. Simultaneously the pins 23 will enter the hollow core pole 4 and when, as has been previously explained, the core pole carrier 20 reaches its foremost position with the face of the upstanding portion 22 disposed adjacent the end of the core poles 4 of one of the molds 2 the bent pin 30 is released from the cam plate 31 and the clamp 25 will be forced into engagement with the core pole 4 to firmly clamp them upon the pins 23. The continued movement of the conveyer in the direction of the arrow will carry the roller 38 into the cam track 34 and the core pole carrier 20 will be forced rearwardly, gradually withdrawing the core poles 4 from the molds 2. When the core poles 4 have been entirely withdrawn the molded blocks are free so that they may be removed from the molds at the discharge point. The movement of the conveyer carries the core poles 4 to the under side of the machine where the individual rollers 38 engage the cam track 35 (see Fig. 10) whereupon the core pole carrier 20 corresponding thereto is moved forwardly to re-insert the core poles 4 in the empty molds 2 on the under side of the molding machine. It is, of course, to be understood that the core pole carriers 20 are moved in synchronism with the molds 2 of the molding machine and that while the molding machine is many times longer than my core pole removing and inserting device a mold 2 will always be moving adjacent a corresponding core pole carrier in position to receive a set of core poles 4. When through the cam track 35 a core pole carrier 20 has again been moved to its foremost position on the underside of the machine the bent pin 30 will have engaged a cam plate 39 (see Fig. 3) similar to the cam plate 31, previously described, and forced the clamp 25 downwardly to free the core poles 4 from the carrier 20. The roller 38 will then pass into the cam track 36 (see Fig. 10) whereby the core pole carrier is moved rearwardly withdrawing the pins 23 from the core poles 4 and leaving the core poles 4 adjusted in the molds 2. The molds 2, carrying the core poles, may then proceed to the filling position while the core pole carriers move to the upper side of the machine and into position to again remove the core poles from the filled molds.

I have indicated in the drawings individual core pole carriers provided with pins 23 and clamps 25 to support four core poles for each mold. It is obvious, however, that, as is frequently desirable, a greater or less number of core poles may be used in the molds and consequently the core pole carriers may be supplied with a corresponding number of pins 23 and with clamps 25 adapted to coact with such pins. I, therefore, construct the core pole carrier so that the pins 23 may be inserted in various positions and also provide interchangeable clamps 25 adapted to coact with the pins 23 in their various positions.

As there is considerable adhesion between the material from which the blocks are molded and the core poles 4 I have found it desirable to mount a plurality of rollers 40 on the frame adjacent the position at which the core poles 4 are picked up by the core pole carriers 20, such rollers being arranged to engage the ends of the core poles 4 before they are gripped by the clamps 25 and gradually force the core poles rearwardly from their normal position in the molds so that the heads thereof bearing the flanges 26 are in proper position to be gripped by the clamps 25 when the clamps are released from the cam plate 31. The action of the rollers 40 frees the core poles 4 and prevents unnecessary strain upon the core pole carriers 20 as they are moved rearwardly by the cam track 34 to remove the core poles from the molds.

It is thought that my invention will be readily understood from the foregoing description without further explanation. It will be apparent that I have succeeded in perfecting a machine whereby the arduous labor connected with the insertion and removal of core poles from continuously operable molding machines is entirely eliminated and that by the use of my machine the necessity of providing a number of men to attend the machine during its operation is dispensed with. By the use of my device the proper number of poles is always inserted in the molds and hence imperfect blocks due to failure of the attendant to insert a full set of core poles are eliminated. It will be further apparent that various changes may be made in the form, construction and arrangement of the parts without departing from the spirit and scope of the invention or sacrificing any of its material advantages, the form hereinbefore described being merely a preferred embodiment thereof.

I claim:

1. In a machine for automatically manipulating the core poles of a continuously operable molding machine, the combination with a plurality of movable molds having removable cores of means moving in synchronism with said molds, and means carried thereby and adapted to automatically withdraw said cores from said molds and to support said cores when disengaged from said molds.

2. In a machine for automatically manipulating the core poles of a continuously operable molding machine, the combination with a plurality of molds having removable cores of means comprising a plurality of elements connected to form a conveyer, means for moving said elements in synchronism with said molds, and means carried by said elements adapted to automatically withdraw said cores from said molds and to support said cores when disengaged from said molds.

3. In a machine for automatically manipulating the core poles of a continuously operable molding machine, the combination with a plurality of movable molds having removable cores of means comprising a plurality of elements connected to form an endless conveyer, means for moving said elements in synchronism with said molds, means carried by said elements adapted to engage the cores in said molds and to support said cores when disengaged from said molds, and means coöperating with said supporting means to rigidly hold said core poles.

4. In a machine for automatically manipulating the core poles of a continuously operable molding machine, the combination with a plurality of movable molds having removable cores of means comprising a plurality of elements connected to form an endless conveyer, means for moving said elements in synchronism with said molds, means carried by said elements adapted to engage the cores in said molds and to support said cores when disengaged from said molds, and means for moving said supporting means toward and from said molding machine whereby said cores are withdrawn from and inserted in said molds.

5. In a machine for automatically manipulating the core poles of a continuously operable molding machine, the combination with a plurality of movable molds having removable cores of means comprising a plurality of elements connected to form an endless conveyer, means for moving said elements in synchronism with said molds, means carried by said elements adapted to engage the cores in said molds and to support said cores when disengaged from said molds, means coöperating with said supporting means to rigidly hold said cores, and means for moving said supporting and coöperating means toward and from said molding machine whereby said cores are withdrawn from and inserted in said molds.

6. In a machine for automatically manipulating the core poles of a continuously operable molding machine, the combination with a plurality of movable molds having removable cores of means comprising a plurality of elements connected to form an endless conveyer, means for moving said elements in synchronism with said molds, means carried by said elements adapted to engage the cores in said molds and to support said cores when disengaged from said molds, clamping means coöperating with said supporting means to rigidly hold said cores, means for moving said supporting and clamping means toward and from said molding machine, and means for actuating said clamping means to clamp and release said cores when the latter are disposed in said molds.

7. In a machine for automatically manipulating the core poles of a continuously operable molding machine, the combination with a plurality of movable molds having removable cores of means comprising a plurality of elements connected to form an endless conveyer, means for moving said elements in synchronism with said molds, means carried by said elements adapted to support said cores when disengaged from said molds, clamping means coöperating with said supporting means to rigidly hold said cores, means for actuating said clamping means to clamp said cores, and means for moving said supporting and clamping means to withdraw said cores from said molds.

8. In a machine for automatically manipulating the core poles of a continuously operable molding machine, the combination with a plurality of movable molds having removable cores of means comprising a plurality of elements connected to form an endless conveyer, means for moving said elements in synchronism with said molds, means carried by said elements adapted to support said cores when disengaged from said molds, clamping means coöperating with said supporting means, means for forcing said cores from said molds to break the adhesion between said cores and the molded material on said molds, means for actuating said clamping means to clamp said cores, and means for moving said supporting and clamping means to withdraw said cores from said molds.

9. In a machine for automatically manipulating the core poles of a continuously operable molding machine, the combination with a plurality of movable molds having removable cores of means comprising a plurality of elements connected to form an endless conveyer, means for moving said elements in synchronism with said molds, means carried by said elements, adapted to support said cores when disengaged from said molds, clamping means coöperating with said supporting means to rigidly hold said cores, means for actuating said clamping means to clamp said cores, means for moving said supporting and clamping means to withdraw said cores from said molds, means for moving said supporting and clamping means to insert said cores in said molds, and means for actuating said clamping means to release said cores.

10. In a machine for automatically manipulating the core poles of a continuously operable molding machine, the combination with a plurality of movable molds having removable cores of means comprising a plurality of elements connected to form an endless conveyer, means for moving said elements in synchronism with said molds, means slidably mounted on said elements, adapted to support said cores when disengaged from said molds, clamping means coöperating with said supporting means to rigidly hold said cores, means for actuating said clamping means to clamp said cores, means for moving said supporting and clamping means to withdraw said cores from said molds, means for moving said supporting and clamping means to insert said cores in said molds, and means for actuating said clamping means to release said cores.

11. In a machine of the character described, the combination with a molding machine of a plurality of elements connected to form a conveyer, means for driving said conveyer, and a core pole carrier mounted on each of said elements and movable transversely with respect to the direction of movement of said conveyer.

12. In a machine of the character described, the combination with a molding machine of a plurality of elements connected to form a conveyer, means for driving said conveyer, and a core pole carrier slidably mounted on each of said elements and movable transversely with respect to the direction of movement of said conveyer.

13. In a machine of the character described, the combination with a molding machine of a plurality of elements connected to form an endless conveyer, means for driving said conveyer, and a core pole carrier slidably mounted and movable transversely with respect to the direction of movement of said conveyer on each of said elements and having a plurality of pins thereon, each adapted to support a core pole.

14. In a machine of the character described, the combination with a molding machine of a plurality of elements connected to form an endless conveyer, means for driving said conveyer, and a core pole carrier slidably mounted and movable transversely with respect to the direction of movement of said conveyer on each of said elements and comprising a plurality of pins, each adapted to support a core pole, and clamping means coöperating with said pins to rigidly hold said core poles.

15. In a machine of the character described, the combination with a molding machine of a plurality of elements connected to form an endless conveyer, means for driving said conveyer, and a core pole carrier slidably mounted and movable transversely with respect to the direction of movement of said conveyer on each of said elements and comprising a plurality of pins, each adapted to support a core pole, and a resiliently mounted clamping plate coöperating with said pins to rigidly hold said core poles.

16. In a machine of the character described, the combination with a molding machine of a plurality of elements connected to form an endless conveyer, means for driving said conveyer, and a core pole carrier slidably mounted and movable transversely with respect to the direction of movement of said conveyer on each of said elements and comprising a plurality of adjustable pins, each adapted to support a core pole, and a resiliently mounted interchangeable clamping plate coöperating with said pins to rigidly hold said core poles.

17. In a machine of the character described, the combination with a molding machine of a plurality of elements connected to form an endless conveyer, means for driving said conveyer, a core pole carrier slidably mounted on each of said elements and comprising a plurality of pins, each adapted to support a core pole, and a resiliently mounted clamping plate coöperating with said pins to rigidly hold said core poles, and means for moving said core pole carriers laterally of said conveyer.

18. In a machine of the character described, the combination with a molding machine comprising a plurality of molds adapted to receive removable core poles of a plurality of elements connected to form an endless conveyer, means for driving said conveyer, whereby said elements are moved in synchronism with the continuously moving molds of the molding machine, a core pole carrier slidably mounted on each of said elements and comprising a plurality of pins, each adapted to support a core pole, and a resiliently mounted clamping plate adapted to coöperate with said pins to rigidly hold said core poles, means for actuating said clamping plates to clamp said core poles when in said molds, and means for moving said core pole carriers laterally of said conveyer to withdraw said core poles from said molds.

19. In a machine of the character described, the combination with a molding machine comprising a plurality of molds adapted to receive removable core poles of a plurality of elements connected to form an endless conveyer, means for driving said conveyer, whereby said elements are moved in synchronism with the continuously moving molds of the molding machine, a core pole carrier slidably mounted on each of said elements and comprising a plurality of pins, each adapted to support a core pole, and a resiliently mounted clamping plate adapted to coöperate with said pins to rigidly hold said core poles, means for actuating said clamping plates to clamp said core poles when in said molds, means for moving said core pole carriers laterally of said conveyer to withdraw said core poles from said molds, means for moving said core pole carriers laterally of said conveyer to insert said core poles in said molds, and means for actuating said clamping plates to free said core poles.

20. In a machine of the character described, the combination with a molding machine comprising a plurality of molds adapted to receive removable core poles of a plurality of elements connected to form an endless conveyer, means for driving said conveyer, whereby said elements are moved in synchronism with the continuously moving molds of the molding machine, a core pole carrier slidably mounted on each of said elements and comprising a plurality of pins, each adapted to support a core pole, and a resiliently mounted clamping plate adapted to coöperate with said pins to rigidly hold said core poles, a cam plate for actuating said clamping plates to clamp said core poles when in said molds, means for moving said core pole carriers laterally of said conveyer to withdraw said core poles from said molds, means for moving said core pole carriers laterally of said conveyer to insert said core poles in said molds, and a cam plate for actuating said clamping plates to free said core poles.

21. In a machine of the character described, the combination with a molding machine, comprising a plurality of connected molds adapted to receive removable core poles, and means for continuously moving said molds, of conveyer means comprising a plurality of connected elements, means for moving said elements in synchronism with the molds of said molding machine, means carried by said elements adapted to engage the core poles in said molds and to support said core poles when disengaged from said molds, means coöperating with said supporting means to rigidly hold said core poles, and means for moving said supporting and coöperating means toward and from said molding machine.

22. In a machine of the character described, the combination with a molding machine, comprising a plurality of connected molds adapted to receive removable core poles, and means for continuously moving said molds, of conveyer means comprising a plurality of connected elements, means for moving said elements in synchronism with the molds of said molding machine, means carried by said elements adapted to engage the core poles in said molds and to support said core poles when disengaged from said molds, clamping means coöperating with said supporting means to rigidly hold said core poles, means for moving said supporting and clamping means toward and from said molding machine, and means for actuating said clamping means to clamp and release said core poles when the latter are disposed in said molds.

23. In a machine of the character described, the combination of a series of traveling molds, removable cores for said molds, and automatic means for withdrawing cores from said successive molds at a predetermined point in the path of travel thereof and for reinserting said cores in successive and different molds at another point in the path of travel thereof.

24. In a machine of the character described, the combination of means for inserting and withdrawing the removable cores of traveling molds during the travel thereof, including a traveling carriage mounted to reciprocate transversely of its path of travel and provided with means for intermittently connecting the carriage with the cores to move the latter with the carriage during its reciprocating movement and to support the cores during the traveling movement of the carriage, and means to reciprocate the carriage across the path of travel to insert and withdraw the cores.

25. In a machine for automatically manipulating the core poles of a continuously operable molding machine, the combination of means located alongside of and traveling in the same direction and at substantially the same rate of speed as the molds of the molding machine, and means carried thereby for inserting and withdrawing the core poles and for supporting said core poles while said means is traveling from withdrawing position to inserting position.

CHARLES F. HENNING.

Witnesses:
  WM. O. BELT,
  M. A. KIDDIE.